(12) United States Patent
Nakamata

(10) Patent No.: US 10,099,516 B2
(45) Date of Patent: Oct. 16, 2018

(54) PNEUMATIC RADIAL TIRE WITH SPECIFIED BEAD PORTIONS

(71) Applicant: TOYO TIRE & RUBBER CO., LTD., Osaka-shi, Osaka (JP)

(72) Inventor: Tsunetaka Nakamata, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 355 days.

(21) Appl. No.: 14/969,206

(22) Filed: Dec. 15, 2015

(65) Prior Publication Data

US 2016/0176242 A1    Jun. 23, 2016

(30) Foreign Application Priority Data

Dec. 22, 2014   (JP) ................................ 2014-258629

(51) Int. Cl.
*B60C 15/06*     (2006.01)
*B60C 15/00*     (2006.01)

(52) U.S. Cl.
CPC ...... *B60C 15/0635* (2013.01); *B60C 15/0009* (2013.01); *B60C 15/0607* (2013.01);
(Continued)

(58) Field of Classification Search
CPC . B60C 15/0607; B60C 15/0603; B60C 15/06; B60C 15/00; B60C 15/0635;
(Continued)

(56) References Cited

U.S. PATENT DOCUMENTS 5,033,524 A * 7/1991 Ohtsuka .................. B60C 15/06
                                                    152/546
5,634,995 A * 6/1997 Kimura ............... B60C 15/0607
                                                    152/539
(Continued)

FOREIGN PATENT DOCUMENTS

CN          1721210 A      1/2006
CN        103863020 A      6/2014
(Continued)

OTHER PUBLICATIONS

Office Action dated Oct. 24, 2017, issued in counterpart German Application No. 10 2015 122 466.6, with English translation (17 pages).

(Continued)

*Primary Examiner* — Adrienne C. Johnstone
(74) *Attorney, Agent, or Firm* — Westerman, Hattori, Daniels & Adrian, LLP

(57) ABSTRACT

A pneumatic radial tire includes a bead filler, a carcass ply, a steel protection layer, and an organic fiber protection layer. A reinforcing rubber sandwiches a wind-up end of the steel protection layer. A relationship of $1 \leq A/B \leq 2$ is satisfied between a width A from the wind-up end of the steel protection layer to a tire inner surface, and a width B from the wind-up end of the steel protection layer to a tire outer surface. The wind-up end of the carcass ply is covered with a ply cover member. A relationship of $0.8 \leq D/C \leq 1.2$ is satisfied between a thickness C of a second bead filler positioning between the ply cover member and a first bead filler, and a thickness D of the reinforcing rubber positioning between the ply cover member and the steel protection layer.

4 Claims, 2 Drawing Sheets

(52) U.S. Cl.
CPC .......... *B60C 15/06* (2013.01); *B60C 15/0603* (2013.01); *B60C 15/0628* (2013.01); *B60C 2015/065* (2013.01); *B60C 2015/0617* (2013.01); *B60C 2015/0621* (2013.01); *B60C 2015/0625* (2013.01); *B60C 2015/0692* (2013.01); *B60C 2200/06* (2013.01); *Y10T 152/10819* (2015.01); *Y10T 152/10828* (2015.01); *Y10T 152/10837* (2015.01); *Y10T 152/10846* (2015.01)

(58) Field of Classification Search
CPC ........ B60C 15/0628; B60C 2015/0625; B60C 2015/0621; B60C 2015/0617; B60C 2015/0692; B60C 2015/065; Y10T 152/10846; Y10T 152/10819; Y10T 152/10828; Y10T 152/10837
USPC ................ 152/539, 541, 542, 543, 546, 547
See application file for complete search history.

(56) References Cited

U.S. PATENT DOCUMENTS

| | | | |
|---|---|---|---|
| 6,298,893 B1 * | 10/2001 | Vannan | B60C 15/06 152/541 |
| 2008/0121329 A1 * | 5/2008 | Kurita | B60C 15/0607 |

FOREIGN PATENT DOCUMENTS

| | | | |
|---|---|---|---|
| DE | 26 48 914 A | * | 5/1978 |
| DE | 10 2005 049 182 A1 | * | 4/2007 |
| DE | 10 2009 026 041 A1 | * | 12/2010 |
| DE | 10 2009 026 098 A1 | * | 1/2011 |
| JP | 7-117419 A | | 5/1995 |
| JP | 09099716 A | * | 4/1997 |
| JP | 2006-15951 A | | 1/2006 |
| JP | 2014-24408 A | | 2/2014 |
| JP | 2014-113920 A | | 6/2014 |
| WO | WO-2007/042119 A1 | * | 4/2007 |

OTHER PUBLICATIONS

Office Action dated Feb. 17, 2017, issued in counterpart Chinese Patent Application No. 201510946526.3, with English translation. (16 pages).

Office Action dated Jun. 23, 2017, issued in counterpart Chinese Application No. 201510946526.3, with English translation. (14 pages).

* cited by examiner

PNEUMATIC RADIAL TIRE WITH SPECIFIED BEAD PORTIONS

BACKGROUND OF THE INVENTION

Field of the Invention

The present invention relates to a pneumatic radial tire which is characterized by a structure of a bead portion and has a high durability, and is particularly useful for a pneumatic radial tire for heavy load.

Description of the Related Art

Conventionally, in a pneumatic radial tire which is used for a heavy vehicle particularly such as an industrial vehicle and a construction vehicle, there has been fear that a trouble such as a separation is caused while beginning at a wind-up end of a carcass ply which is wound around a bead core. In order to address this problem, there has been known a method which improves a durability of a bead portion by arranging a protection layer along an outer side of the carcass ply of the bead portion as described in patent documents 1 to 3. However, there is a case that that pneumatic radial tire is used under a high internal pressure in some countries or areas, and it is necessary to further improve the durability of the bead portion.

In order to suppress the trouble in the wind-up end of the carcass ply, a steel protection layer including a steel cord is suitable as disclosed in the patent document 1. However, in the case that the steel protection layer as mentioned above is arranged, there is a risk that the trouble is generated while beginning at an end portion of the steel protection layer, and it has been found that there is room for improvement of the risk.

PRIOR ART DOCUMENT

Patent Document

Patent Document 1: JP-A-2014-24408
Patent Document 2: JP-A-2014-113920
Patent Document 3: JP-A-7-117419

SUMMARY OF THE INVENTION

The present invention is made by taking the actual condition mentioned above into consideration, and an object of the present invention is to provide a pneumatic radial tire which suppresses troubles not only in a wind-up end of a carcass play, but also in an end portion of a steel protection layer, and is excellent in a durability of a bead portion.

The object can be achieved by the following present invention. That is, the present invention provides a pneumatic radial tire including a bead core which is buried in a bead portion; a bead filler which is arranged in an outer side in a tire diametrical direction of the bead core; a carcass ply which is wound up from an inner side to an outer side in a tire width direction around the bead core so as to sandwich the bead filler; a steel protection layer which is arranged along an outer side of the carcass ply in the bead portion, and is wound up from the inner side to the outer side in the tire width direction around the bead core; and an organic fiber protection layer which is arranged along an outer side of the steel protection layer in the bead portion, and is wound up form the inner side to the outer side in the tire width direction around the bead core, wherein the bead filler is constructed by a first bead filler which is arranged in adjacent to the bead core, and a second bead filler which is arranged in an outer side in the tire width direction of the first bead filler, wherein a reinforcing rubber is provided in an outer side in the tire width direction of the second bead filler so as to sandwich a wind-up end of the steel protection layer and a wind-up end of the organic fiber protection layer, wherein a relationship of $1 \leq A/B \leq 2$ is satisfied between a width A from the wind-up end of the steel protection layer to a tire inner surface in a parallel direction to a normal line of the tire inner surface which passes through the wind-up end of the steel protection layer, and a width B from the wind-up end of the steel protection layer to a tire outer surface in a parallel direction to the normal line, wherein the wind-up end of the carcass ply is covered with a ply cover member, and wherein a relationship of $0.8 \leq D/C \leq 1.2$ is satisfied between a thickness C of the second bead filler which is positioned between the ply cover member and the first bead filler, and a thickness D of the reinforcing rubber which is positioned between the ply cover member and the steel protection layer.

In the pneumatic radial tire according to the present invention, since the wind-up end of the steel protection layer is sandwiched by the reinforcing rubber, it is possible to suppress the trouble beginning at the end portion of the steel protection layer. Further, since the distance from the tire inner surface and the tire outer surface to the steel protection layer can be secured by setting the width A from the wind-up end of the steel protection layer to the tire inner surface and the width B from the wind-up end of the steel protection layer to the tire outer surface so as to satisfy the relationship mentioned above, it is possible to effectively suppress the trouble beginning at the end portion of the steel protection layer. Further, it is possible to suppress the trouble beginning at the wind-up end of the carcass ply by covering the wind-up end of the carcass ply with the ply cover member. Further, it is possible to effectively suppress the trouble beginning at the wind-up end of the carcass ply by setting the thickness C of the second bead filler and the thickness D of the reinforcing rubber which sandwich the ply cover member from both sides, so as to satisfy the relationship mentioned above.

In the pneumatic radial tire according to the present invention, it is preferable that the wind-up end of the steel protection layer is covered with a U-shaped steel protection layer cover member, and a relationship of $0.8 \leq F/E \leq 1.2$ is satisfied between a thickness E of the reinforcing rubber which is positioned in an inner side in a tire width direction of the steel protection layer cover member, and a thickness F of the reinforcing rubber which is positioned in an outer side in the tire width direction of the organic fiber protection layer, on a line which is perpendicular to a wind-up line of the steel protection layer and passes through the wind-up end of the steel protection layer.

According to the structure, it is possible to suppress the trouble beginning at the end portion of the steel protection layer by covering the wind-up end of the steel protection layer with the steel protection layer cover member. Further, it is possible to effectively suppress the trouble beginning at the end portion of the steel protection layer by setting the thicknesses E and F of the reinforcing rubbers sandwiching the steel protection layer from both sides so as to satisfy the relationship mentioned above.

In the pneumatic radial tire according to the present invention, it is preferable that a rubber hardness of the ply cover member is higher than a rubber hardness of the second bead filler and the reinforcing rubber, and is lower than a rubber hardness of a topping rubber of the carcass ply.

According to the structure, since it is possible to reduce a strain in the wind-up end of the carcass ply by changing the rubber hardness of the rubber around the carcass ply little by little, it is possible to suppress the trouble beginning at the wind-up end of the carcass ply.

In the pneumatic radial tire according to the present invention, it is preferable that the ply cover member has a U-shaped coating portion which covers the wind-up end of the carcass ply, and an extension portion which extends toward an outer side in a tire diametrical direction from the coating portion, and the extension portion has a leading end that is arranged closer to the outer side in the tire diametrical direction than the wind-up end of the steel protection layer.

According to the structure, since the wind-up end of the steel protection layer can be protected by the extension portion of the ply cover member, it is possible to suppress the trouble beginning at the wind-up end of the steel protection layer.

DETAILED DESCRIPTION OF THE PREFERRED EMBODIMENTS

Figure 1:
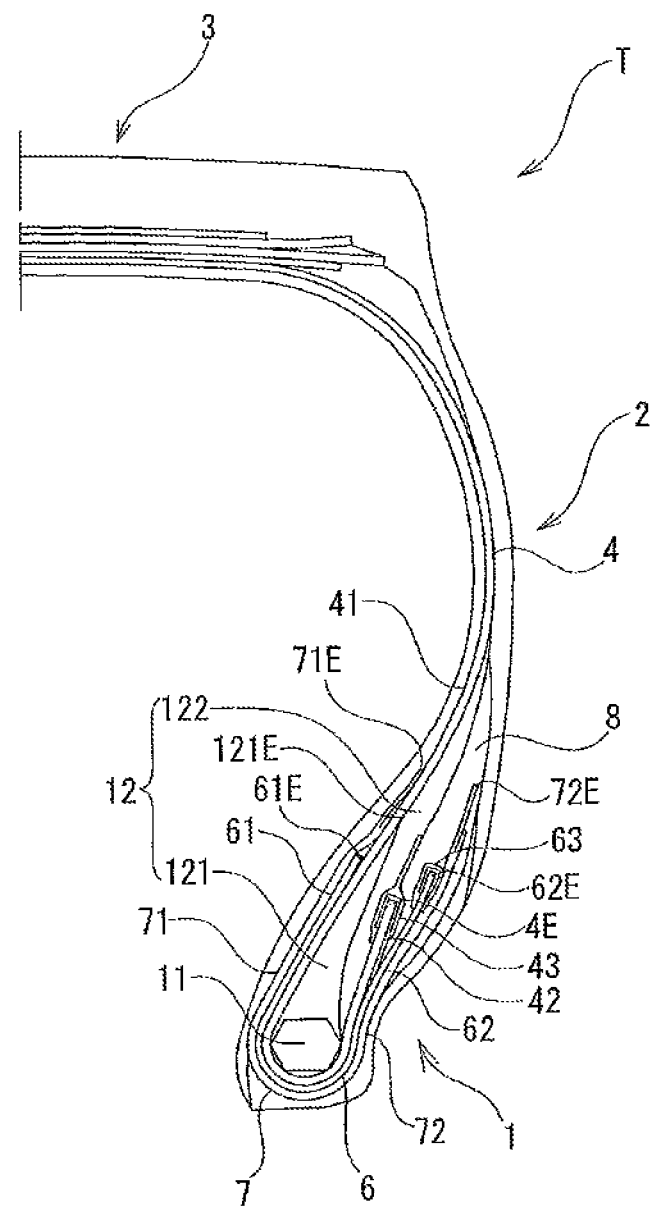
FIG. 1 is a tire meridian cross sectional view showing an example of a pneumatic radial tire according to the present invention.
Figure 2:
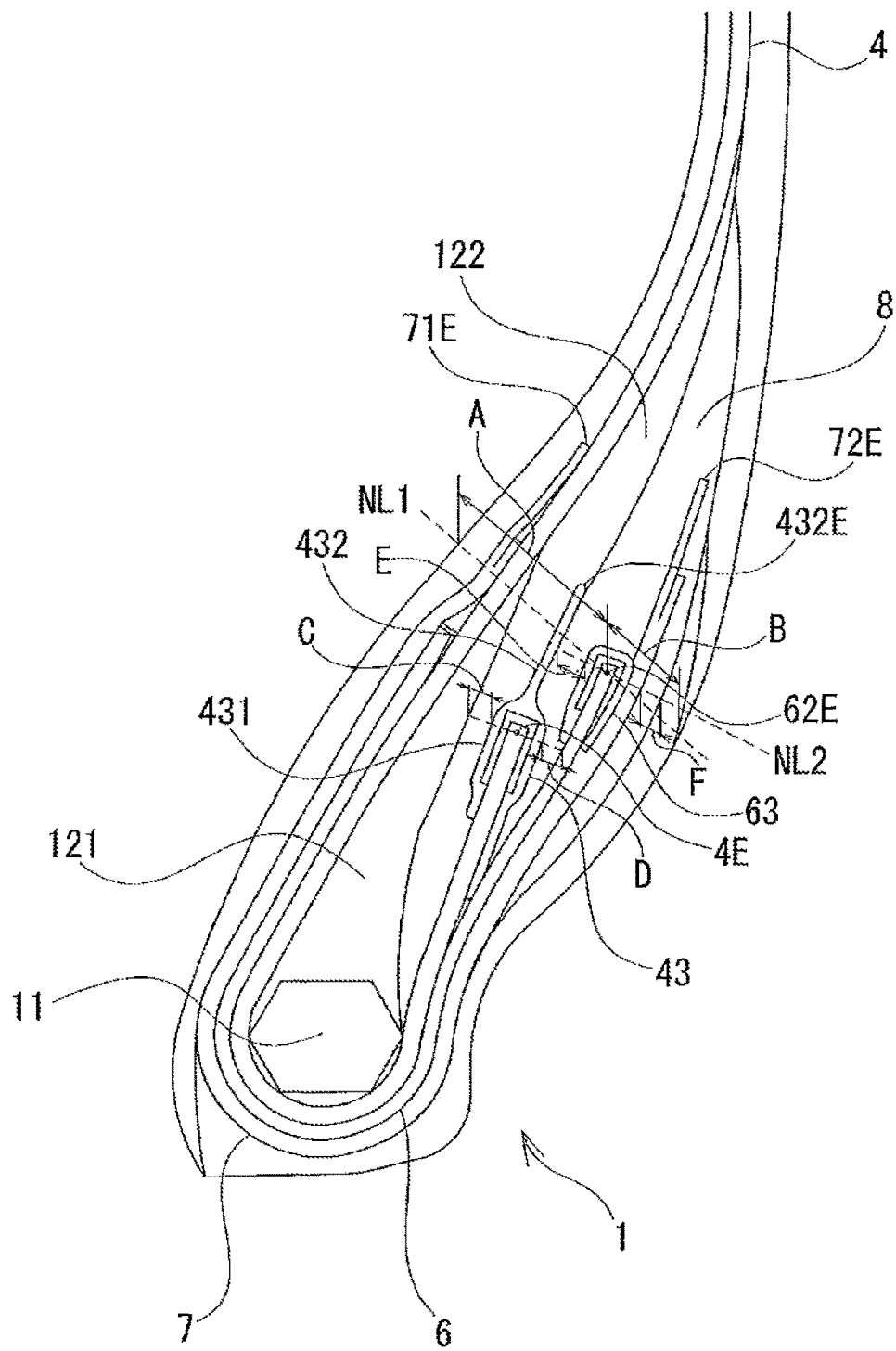
FIG. 2 is a cross sectional view showing a bead portion of the tire in FIG. 1 in an enlarged manner.

A description will be given below of an embodiment according to the present invention with reference to the accompanying drawings. A tire T shown in FIG. 1 is an example of a pneumatic radial tire according to the present invention, and a tire meridian cross section when the tire is installed to a standard rim is shown. The standard rim installation time means a state in which the tire is installed to a rim defined by JATMA in correspondence to a tire size and air having a pneumatic pressure of 50 kPa is charged. FIG. 2 is a cross sectional view showing a bead portion 1 of the tire T in an enlarged manner.

The tire T is provided with a pair of bead portions 1, side wall portions 2 which extend outward in a tire diametrical direction from the bead portions 1, and a tread portion 3 which is connected to outer ends in the tire diametrical direction of the side wall portions 2. A bead core 11 is buried in the bead portion 1, and a bead filler 12 is arranged in an outer side in the tire diametrical direction of the bead core 11.

Further, the tire T is provided with a carcass ply 4 which reaches the bead portion 1 from the tread portion 3 via the side wall portion 2, and is wound up from an inner side to an outer side in a tire width direction around the bead core 11 so as to sandwich the bead filler 12.

The bead core 11 is constructed by a convergent body which is obtained by laminating and winding wires coated with rubber, and is formed into an annular shape along a tire circumferential direction. The bead filler 12 has a shape which is tapered toward an outer side in the tire diametrical direction, and a leading end thereof is arranged closer to an outer side in the tire diametrical direction than a wind-up end 4E of the carcass ply 4.

The bead filler 12 is constructed by a first bead filler 121 which is arranged in adjacent to the bead core 11, and a second bead filler 122 which is arranged in an outer side in the tire width direction of the first bead filler 121. The first bead filler 121 is formed into an approximately triangular shape in its cross section, the second bead filler 122 is arranged in adjacent to an outer side of the first bead filler 121, and the bead filler 12 is formed into an approximately triangular shape as a whole in its cross section. The first bead filler 121 has a higher hardness than the second bead filler 122. For example, a rubber hardness of the first bead filler 121 is equal to or more than 110, and a rubber hardness of the second bead filler 122 is equal to or less than 100. The rubber hardness in the present invention means a harness which is measured according to a durometer hardness test (type A) of JISK6253.

The carcass ply 4 is provided with a wind-up portion 42 which is arranged in an outer side in the tire width direction of the bead core 11 and the bead filler 12 in series with a main body portion 41 which reaches the bead portion 1 from the tread portion 3 via the side wall portion 2. The wind-up end 4E is an end portion of the wind-up portion 42. The carcass ply 4 is formed by coating a plurality of carcass cords which are arranged in an approximately orthogonal direction to the tire circumferential direction, with the rubber. A material of the carcass cord preferably employs metals such as steel, and organic fibers such as polyester, rayon, nylon and aramid.

Further, the tire T is provided with a steel protection layer 6 which includes a steel cord. The steel protection layer 6 is arranged along an outer side of the carcass ply 4 of the bead portion 1, and is wound up from an inner side in the tire width direction to an outer side around the bead core 11. In other words, the steel protection layer 6 is provided with an outer side portion 62 which is positioned in an outer side in the tire width direction of the wind-up portion 42, in series with an inner side portion 61 which is positioned in an inner side in the tire width direction of the main body portion 41. An inner end 61E is an end portion of the steel protection layer 6 (the inner side portion 61) which is positioned in the inner side in the tire width direction, and an outer end 62E (corresponding to the wind-up end of the steel protection layer 6) is an end portion of the steel protection layer 6 (the outer side portion 62) which is positioned in the outer side in the tire width direction.

The steel protection layer 6 is formed by coating a plurality of steel cords which are arranged in an inclined direction to the tire diametrical direction, with the rubber. A plurality of steel cords is arranged in parallel to each other, and an angle of inclination to the tire diametrical direction is set, for example, between 50 and 80 degrees. The steel protection layer 6 is in contact with the carcass ply 4 from an outer side so as to cover the carcass ply 4. The end number (a cord number per 1 inch in a cord width direction) of the steel cord is preferably equal to or more than 10/inch, and a cord diameter of the steel cord is preferably equal to or more than 0.9 mm.

Further, the tire T has an organic fiber protection layer 7 which includes an organic fiber cord. The organic fiber protection layer 7 is arranged along an outer side of the steel protection layer 6 of the bead portion 1, and is wound up from an inner side to an outer side in the tire width direction around the bead core 11. In other words, the organic fiber protection layer 7 is provided with an outer side portion 72 which is positioned in an outer side in the tire width direction of the outer side portion 62, in series with an inner side portion 71 which is positioned in an inner side in the tire width direction of the inner side portion 61. An inner end 71E is an end portion of the organic fiber protection layer 7 (the inner side portion 71) which is positioned in the inner side in the tire width direction, and an outer end 72E (corresponding to a wind-up end of the organic fiber protection layer 7) is an end portion of the organic fiber protection layer 7 (the outer side portion 72) which is positioned in the outer side in the tire width direction.

The organic fiber protection layer 7 is formed by coating a plurality of organic fiber cords which are arranged in an inclined direction to the tire diametrical direction, with the rubber. A plurality of organic fiber cords are arranged in parallel to each other, and an angle of inclination to the tire diametrical direction is set, for example, between 30 and 60 degrees. Nylon, polyester, rayon and aramid can be exemplified as a material of the organic fiber cord. The organic fiber protection layer 7 is in contact with the steel protection layer 6 from an outer side so as to cover the steel protection layer 6. The end number of the organic fiber cord is preferably equal to or more than 15/inch, and a cord diameter of the organic fiber cord is preferably equal to or more than 0.4 mm.

A reinforcing rubber 8 is provided in an outer side in the tire width direction of the second bead filler 122 so as to sandwich the outer end 62E of the steel protection layer 6 and the outer end 72E of the organic fiber protection layer 7 from both sides in the tire width direction. The reinforcing rubber 8 is arranged in adjacent to an outer side in the tire width direction of the second bead filler 122. The wind-up end 4E of the carcass ply 4 is sandwiched by the second bead filler 122 and the reinforcing rubber 8.

An upper end 121E of the first bead filler 121 is arranged closer to an outer side in the tire diametrical direction than the outer end 62E of the steel protection layer 6. Further, the wind-up end 4E of the carcass ply 4 is arranged closer to an inner side in the tire diametrical direction than the outer end 62E of the steel protection layer 6.

Further, the outer end 72E of the organic fiber protection layer 7 is arranged closer to an outer side in the tire diametrical direction than the outer end 62E of the steel protection layer 6, and the inner end 71E of the organic fiber protection layer 7 is arranged closer to an outer side in the tire diametrical direction than the inner end 61E of the steel protection layer 6.

According to the steel protection layer 6 in which the end portions are arranged as mentioned above, it is possible to suppress the trouble such as the separation beginning at the wind-up end 4E of the carcass ply 4. Further, according to the organic fiber protection layer 7 in which the end portions are arranged as mentioned above, it is possible to suppress the trouble such as the separation beginning at the inner end 61E and the outer end 62E of the steel protection layer 6.

The organic fiber protection layer 7 is preferably constructed by at least two layers, and the organic fiber protection layer 7 according to the present embodiment is constructed by two layers which are overlapped so that the organic fiber cords in relation to the tire diametrical direction are inclined inversely to each other. A positional relationship of the end portions of the organic fiber protection layer may be satisfied by at least one layer among a plurality of layers which construct the organic fiber protection layer. However, the positional relationship is preferably satisfied by all the layers as in the present embodiment.

A width A is a distance from the wind-up end 62E of the steel protection layer 6 to a tire inner surface in a parallel direction to a normal line NL1. The normal line NL1 is a normal line of the tire inner surface passing through the wind-up end 62E of the steel protection layer 6. A width B is a distance from the wind-up end 62E of the steel protection layer 6 to a tire outer surface in the parallel direction to the normal line NL1. The width A and the width B satisfy a relationship of $1 \leq A/B \leq 2$. As a result, it is possible to secure the distance from the tire inner surface and the tire outer surface to the steel protection layer 6, thereby effectively suppressing the trouble beginning at the end portion of the steel protection layer 6.

The wind-up end 4E of the carcass ply 4 is covered with a ply cover member 43. As a result, it is possible to suppress the trouble beginning at the wind-up end 4E of the carcass ply 4. The ply cover member 43 is constructed by being rubberized to an organic fiber cord such as a nylon cord.

The rubber hardness of the ply cover member 43 is preferably higher than the rubber hardness of the second bead filler 122 and the reinforcing rubber 8, and lower than the rubber hardness of the topping rubber of the carcass ply 4. Since the strain in the wind-up end 4E of the carcass ply 4 can be reduced by reducing the rubber hardness of the rubber around the carcass ply 4 toward the outer side little by little, it is possible to suppress the trouble beginning at the wind-up end 4E of the carcass ply 4. For example, the rubber harness of the ply cover member 43 is between 101 and 103, the rubber hardness of the second bead filler 122 and the reinforcing rubber 8 is equal to or less than 100, and the rubber hardness of the topping rubber of the carcass ply 4 is between 104 and 106. The rubber hardness may be the same in the second bead filler 122 and in the reinforcing rubber 8; however, the rubber hardness of the reinforcing rubber 8 may be set to be lower than the rubber hardness of the second bead filler 122 so as to make the reinforcing rubber 8 hard to generate heat. Further, the rubber hardness of the topping rubber of the steel protection layer 6 is between 104 and 106.

The ply cover member 43 has a U-shaped coating portion 431 which covers the wind-up end 4E of the carcass ply 4, and an extension portion 432 which extends toward an outer side in the tire diametrical direction from the coating portion 431. The extension portion 432 has a leading end 432E that is preferably arranged closer to an outer side in the tire diametrical direction than the wind-up end 62E of the steel protection layer 6. As a result, the wind-up end 62E of the steel protection layer 6 can be protected by the extension portion 432 of the ply cover member 43, thereby suppressing the trouble beginning at the wind-up end 62E of the steel protection layer 6. The extension portion 432 is arranged along a boundary portion between the second bead filler 122 and the reinforcing rubber 8. The extension portion 432 is preferably equal to or more than 10 mm so as to securely protect the wind-up end 62E of the steel protection layer 6.

A relationship of $0.8 \leq D/C \leq 1.2$ is satisfied between a thickness C of the second bead filler 122 which is positioned between the ply cover member 43 and the first bead filler 121, and a thickness D of the reinforcing rubber 8 which is positioned between the ply cover member 43 and the steel protection layer 6. As a result, the carcass ply 4 can be sandwiched by the second bead filler 122 and the reinforcing rubber 8 which have the same degree of thicknesses from both sides, thereby effectively suppressing the trouble beginning at the wind-up end 4E of the carcass ply 4. The thickness C and the thickness D are thicknesses on a line which is perpendicular to a wind-up line of the carcass ply 4 and passes through the wind-up end 4E.

The wind-up end 62E of the steel protection layer 6 is covered with a U-shaped steel protection layer cover member 63. As a result, it is possible to suppress a trouble beginning at the wind-up end 62E of the steel protection layer 6. The steel protection layer cover member 63 is constructed by an organic fiber cord such as a nylon cord.

A line NL2 is a line which is perpendicular to the wind-up line of the steel protection layer 6 and passes through the wind-up end 62E of the steel protection layer 6. A relationship of 0.8≤F/E≤1.2 is preferably satisfied between a thickness E of the reinforcing rubber 8 which is positioned in the inner side in the tire width direction of the steel protection layer cover member 63, and a thickness F of the reinforcing rubber 8 which is positioned in the outer side in the tire width direction of the organic fiber protection layer 7, on the line NL2. As a result, since the steel protection layer 6 can be sandwiched by the reinforcing rubbers 8 having the same degree of thicknesses from both sides, it is possible to effectively suppress a trouble beginning at the wind-up end 62E of the steel protection layer 6.

The pneumatic radial tire according to the present invention is the same as the conventional pneumatic radial tire except the structure mentioned above of the bead portion, and all of the conventionally known materials, shapes, structures and manufacturing methods can be applied to the present invention. The bead structure as mentioned above may be applied to the bead portion at least in one side. However, the bead structure is preferably applied to the bead portions in both sides.

Since the pneumatic radial tire according to the present invention is excellent in the durability of the bead portion, the pneumatic radial tire is useful for a pneumatic radial tire for heavy load which is used in a vehicle having a heavy vehicle weight such as a truck, a bus, an industrial vehicle and a construction vehicle.

EXAMPLES

A durability test of the bead portion was carried out for specifically showing the structures and the effects of the present invention, and will be described below. A size of a tire supplied for the test was 11.00R20, and the tire was installed to a rim of 8.00V.

In the durability test, the tire was made to travel on a drum having a diameter of 1700 mm under a condition of an internal pressure of 830 kPa, a load of 3350 kgf (increased 10% per 24 hours) and a speed of 25 km/h, until the bead portion breaks down. Further, the durability was evaluated by an index number obtained by setting a result of a comparative example 1 to 100 in the traveling distance. Further, it was checked out whether or not any crack (obtained by progress of the separation) exists in the wind-up end of the steel protection layer and the wind-up end of the carcass ply, in the tire after the test travel.

The bead structure and the result of evaluation in each of the examples are shown in Table 1. In the carcass cord, a wire structure is 3+9+15×0.175, and the end number is 15/inch. In the steel cord, a wire structure is 3+9+15×0.175, the end number is 14/inch, and an angle of inclination in relation to the tire diametrical direction is 60 degrees. The organic fiber protection layer includes the nylon cord as the organic fiber cord, and is structured such that the end number is 18/inch, a cord diameter is 0.6 mm, and an angle of inclination in relation to the tire diametrical direction is 50 degrees.

TABLE 1

|  | Comparative example 1 | Comparative example 2 | Comparative example 3 | Comparative example 4 | Comparative example 5 | Example 1 | Comparative example 6 |
|---|---|---|---|---|---|---|---|
| A/B | 2.5 | 2.0 | 1.5 | 1.0 | 0.8 | 1.5 | 1.5 |
| D/C | 2 | 2 | 2 | 2 | 2 | 1 | 0.5 |
| Traveling distance | 100 | 120 | 140 | 135 | 90 | 170 | 90 |
| Crack in end portion of steel protection layer | With | Without | Without | Without | With | Without | Without |
| Crack in end portion of carcass ply | With | With | With | With | With | Without | With |
| Trouble at the other positions | Without | Without | Without | Without | Without | With | Without |

As shown in Table 1, in comparative examples 2 to 4, the traveling distance until the trouble was caused was longer than the comparative example 1; however, a crack was confirmed in the wind-up end of the carcass ply. In comparative examples 5 and 6, the traveling distance until the trouble was caused was shorter than the comparative example 1, and a crack was confirmed in the wind-up end of the carcass ply or the end portion of the steel protection layer. In an example 1, the traveling distance until the trouble was caused was longer than the comparative example 1, and no crack was affirmed in the wind-up end of the carcass ply and in the end portion of the steel protection layer. As mentioned above, the example 1 is excellent in the durability of the bead portion in comparison with the comparative examples 1 to 6.

What is claimed is:
1. A pneumatic radial tire comprising:
   a pair of bead portions, side wall portions extending outward in the tire diametrical direction from the bead portions, and a tread portion connected to outer ends in the tire diametrical direction of the side wall portions;
   a bead core which is buried in a respective bead portion;
   a bead filler which is arranged in an outer side in a tire diametrical direction of the bead core;
   a carcass ply which reaches the bead portions from the tread portion via the side wall portions and which is wound up from an inner side to an outer side in a tire width direction around the bead core so as to form a wind-up end of the carcass ply and to sandwich the bead filler;
   a steel protection layer which is arranged along an outer side of the carcass ply in the bead portion, and is wound up from the inner side to the outer side in the tire width direction around the bead core so as to form inner and outer wind-up ends in the tire width direction of the steel protection layer; and
   an organic fiber protection layer which is arranged along an outer side of the steel protection layer in the bead portion, and is wound up from the inner side to the outer side in the tire width direction around the bead core so as to form inner and outer wind-up ends in the tire width direction of the organic fiber protection layer, wherein the bead filler is constructed by a first bead filler which is arranged adjacent to the bead core, and a second bead filler which is arranged in an outer side in the tire width direction of the first bead filler, wherein a reinforcing rubber is provided in an outer side in the tire width direction of the second bead filler so as to sandwich the outer wind-up end of the steel protection layer and the outer wind-up end of the organic fiber protection layer from both sides in the tire width direction, wherein a relationship of $1 \leq A/B \leq 2$ is satisfied between a width A from the outer wind-up end of the steel protection layer to a tire inner surface in a parallel direction to a normal line of the tire inner surface which passes through the outer wind-up end of the steel protection layer, and a width B from the outer wind-up end of the steel protection layer to a tire outer surface in a parallel direction to the normal line, wherein the wind-up end of the carcass ply is covered with a ply cover member, and wherein a relationship of $0.8 \leq D/C \leq 1.2$ is satisfied between a thickness C of the second bead filler which is positioned between the ply cover member and the first bead filler, and a thickness D of the reinforcing rubber which is positioned between the ply cover member and the steel protection layer, on a line which is perpendicular to a wind-up line of the carcass ply and passes through the wind-up end of the carcass ply.

2. The pneumatic radial tire according to claim 1, wherein the outer wind-up end of the steel protection layer is covered with a U-shaped steel protection layer cover member, and wherein a relationship of $0.8 \leq F/E \leq 1.2$ is satisfied between a thickness E of the reinforcing rubber which is positioned in an inner side in a tire width direction of the steel protection layer cover member, and a thickness F of the reinforcing rubber which is positioned in an outer side in the tire width direction of the organic fiber protection layer, on a line which is perpendicular to a wind-up line of the steel protection layer and passes through the outer wind-up end of the steel protection layer.

3. The pneumatic radial tire according to claim 1, wherein the first and second bead fillers are rubber bead fillers, the carcass ply is a rubberized cord ply, the ply cover member is a rubberized organic fiber cord member, and the rubber hardness of the ply cover member is higher than the rubber hardness of the second bead filler and the reinforcing rubber, and is lower than the rubber hardness of the carcass ply.

4. The pneumatic radial tire according to claim 1, wherein the ply cover member has a U-shaped coating portion which covers the outer wind-up end of the carcass ply, and an extension portion which extends toward an outer side in a tire diametrical direction from the coating portion, and wherein the extension portion has a leading end that is arranged closer to the outer side in the tire diametrical direction than the outer wind-up end of the steel protection layer.

* * * * *